Figure 1:
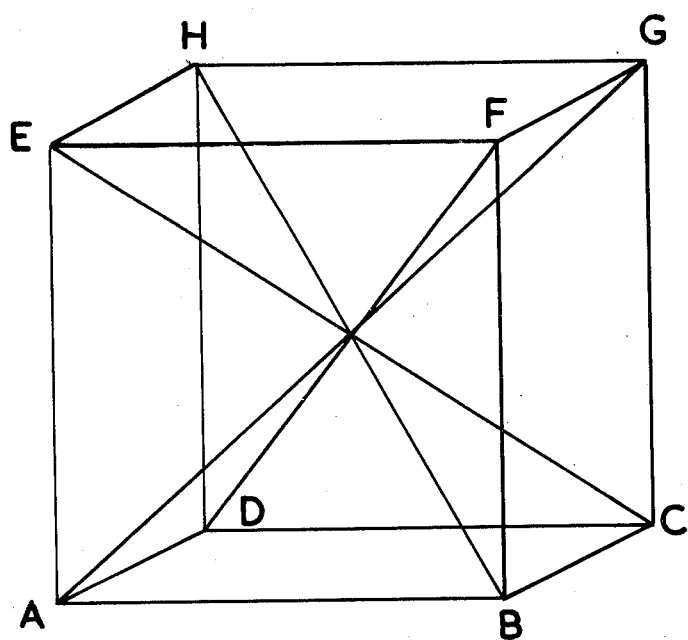

United States Patent [19]
Kimberley

[11] 4,084,774
[45] Apr. 18, 1978

[54] REDUNDANT OFF-AXIS SENSOR ASSEMBLIES

[75] Inventor: David Kimberley, Fleet, England

[73] Assignee: Secretary of State for Defence in Her Britannic Majesty's Government of the United Kingdom of Great Britain and Northern Ireland, London, England

[21] Appl. No.: 704,262

[22] Filed: Jul. 12, 1976

[30] Foreign Application Priority Data

Jul. 15, 1975 United Kingdom ............... 29617/75

[51] Int. Cl.² .............................................. G05D 1/00
[52] U.S. Cl. ..................................... 244/194; 33/321; 73/178 R; 235/307; 364/450
[58] Field of Search ............... 33/321; 73/178 R, 504; 74/5.34; 235/150.2, 150.25, 153 AE; 244/3.2, 164, 165, 171, 177, 176, 194; 318/648, 649, 489; 340/27

[56] References Cited

U.S. PATENT DOCUMENTS

| 3,403,874 | 10/1968 | Boskovich et al. ................... 244/194 |
| 3,463,909 | 8/1969 | Weiss ................................ 235/150.25 |
| 3,492,465 | 1/1970 | Buscher et al. ................... 244/194 X |

OTHER PUBLICATIONS

Gilmore et al., Jerold P., A Redundant Strapdown Inertial Reference Unit, J. Spacecraft, vol. 9, No. 1, Jan. 1972, pp. 39-47.

*Primary Examiner*—Stephen G. Kunin
*Attorney, Agent, or Firm*—Pollock, Vande Sande and Priddy

[57] ABSTRACT

An assembly of single-component motion sensors consists of four equinumerous groups of sensors. All the sensors in any one group have their measurement axes parallel and the directions of the measurement axes of the four groups are parallel to the diagonals of a rectangular parallelepiped. The edges of the imaginary parallelepiped are parallel to the coordinate axes relative to which it is desired to measure the components of motion. With two sensors per group the assembly can still give results after any two sensors have failed. It is shown how two non-simultaneous failures, and, in some cases, two simultaneous failures, can be located.

4 Claims, 6 Drawing Figures

REDUNDANT OFF-AXIS SENSOR ASSEMBLIES

This invention relates to sensor assemblies for measuring components of the motion of aircraft relative to three orthogonal axes, namely the pitch axis, the yaw axis and the roll axis.

A sensor assembly for use in a flight control system must, if such systems are to become acceptable, have a very high degree of reliability since a consequence of failure could easily be a fatal loss of control. The reliability of the assembly must be greater than that of any of the individual sensors. The usual criterion is that the assembly must still work when any two of the sensors have failed, not simultaneously. One way of achieving this is to have four sensors for each of the measurement axes making twelve sensors in all. This way is called "quadruplexing".

A computer monitors the readings of the sensors and when one of a group of four sensors produces a reading incompatible with the readings of the other three that one is deemed to have failed and its reading is henceforth ignored. There are still three working sensors left in the group which is enough to be able to locate a second failure correctly. Such systems for picking out and discarding mavericks in a group of three or more nominally identical channels and deriving a consensus output are well known and are called "majority vote" systems. Such an arrangement certainly satisfies the two-failure criterion but at considerable cost. In fact the arrangement will still work after two failures in each of the three groups, six failures in all, but it will not work after three failures in any one group, so it does not make the best use of the high degree of redundancy in the arrangement.

It is desirable to have an arrangement which makes better use of its redundancy so that either it will satisfy the two-failure criterion with fewer than twelve sensors or it will satisfy a more severe criterion such as four-failure working with no more than twelve sensors.

An arrangement has been suggested with only six sensors which satisfies the two-failure criterion but its performance is less good as regards failure transients. When a sensor assembly, for example an assembly employing quadruplexing, is working normally, the readings of the four sensors in each group will be averaged and the average reading will be taken as the reading for that group. Since no sensor is absolutely precise each has a margin of error S, so that the reading of a sensor may vary by as much as S above or below the correct reading even when it is working properly. When the reading of a sensor is being compared with those of the other sensors in its group this fact must be allowed for, so that if, as may happen, one member of the group is giving a reading which is too high by an amount S, whereas the other three are giving readings which are too low by an amount S, the sensor giving the higher reading will not falsely be deemed to have failed, and if, in these circumstances, one of sensors giving a low reading fails so as to give an even lower reading, it will be that sensor and not the one giving the high reading which is deemed to have failed. A consequence of this is that failures are not detected immediately they occur. If a failure occurred in the sensor which was giving the higher reading, such as to make it give a rapidly decreasing reading, the computer, if it compared the reading from that sensor with the average reading of the other three and detected a failure when the difference exceeded 8S/3, would not detect the failure until the reading from the failed sensor had fallen by 14S/3, from 2S above the others to 8S/3 below. There is therefore a transient contribution to the reading for the group due to the delay between a failure and the detection of the failure. This contribution will be called the "detection transient". There will also be another transient contribution when the reading from the failed sensor is removed from consideration and the computer changes from taking the average of all four readings to taking the average of the readings from the three working sensors. This contribution will be called the "switching transient". The detection transient and the switching transient are collectively known as "failure transients". It is important that the failure transients should not be excessively large, especially if the assembly is for use in a fly-by-wire system, because otherwise they may cause the aircraft to make such a lurch that control is lost completely or physical damage sustained.

The magnitudes of the failure transients depend partly on the margin of error S so they can be reduced by reducing the margin of errors of the sensors. There is a point, however, beyond which it is not practicable to reduce the margin of error because the sensors become too elaborate or costly or less rugged. For any given arrangement of sensors there will therefore be minimum practicable failure transients.

It is an object of the present invention to provide a sensor assembly which makes better use of its redundancy than an assembly employing quadruplexing but which does not give excessively large failure transients.

According to the present invention there is provided an assembly of single-component motion sensors comprising four equinumerous groups of sensors, each group comprising a plurality of sensors having their measurement axes parallel, wherein the measurement axes of the sensors in the four groups are respectively in the directions $(\alpha, \beta, \gamma)$, $(-\alpha, \beta, \gamma)$, $(-\alpha, -\beta, \gamma)$ and $(\alpha, -\beta, \gamma)$ relative to three orthogonal axes, where $\alpha$, $\beta$ and $\gamma$ are three non-zero numbers the sum of whose squares is equal to unity.

Another way of expressing the geometrical relationship between the measurement axes is to say that they are parallel to respective diagonals of a rectangular parallelepiped. The edges of the parallelepiped are parallel to the three orthogonal axes.

When the assembly is installed in an aircraft the three orthogonal axes are preferably parallel to the pitch, roll and yaw axes respectively.

The numbers $\alpha$, $\beta$ and $\gamma$ may be equal, each to each, and each to the reciprocal of the square root of three. In this case the rectangular parallelepiped is a cube.

There may be two sensors in each group, making a total of eight sensors, in which case the assembly can still produce results after two of the sensors have failed. Alternatively there may be three sensors in each group, making a total of twelve sensors, in which case the assembly can still produce results after four of the sensors have failed.

Computing means may be provided for failure detection and compensation according to the principles and equations hereinafter presented.

For the purposes of explaining how readings from the sensors may be combined to give the required components of angular velocity and how failed sensors may be identified it will be convenient to number the groups of sensors and also the sensors within each group. Accordingly the groups whose measurement axes are in the directions $(\alpha, \beta, \gamma)$, $(-\alpha, \beta, \gamma)$, $(-\alpha, -\beta, \gamma)$ and $(\alpha, -\beta, \gamma)$ will be called group 1, group 2, group 3 and group 4 respectively. The reading from the first sensor in group 1 will be called $W_{11}$; that from the second sensor in group 1 $W_{12}$; that from the first sensor in group 2 $W_{21}$ and so on. If the components of the motion parallel to the three orthogonal axes are respectively $P_1$, $P_2$ and $P_3$ then the relationships between the readings W and the components P for an assembly with two sensors in each group are, neglecting errors due to imprecision of the sensors:

$$W_{11} = W_{12} = \alpha P_1 + \beta P_2 + \gamma P_3$$

$$W_{21} = W_{22} = -\alpha P_1 + \beta P_2 + \gamma P_3$$

$$W_{31} = W_{32} = -\alpha P_1 - \beta P_2 + \gamma P_3$$

$$W_{41} = W_{42} = \alpha P_1 - \beta P_2 + \gamma P_3$$

Hence expressions can be deduced for the components P in terms of the readings W. For each component P there are eight expressions, which can be considered as two sets of four. In the case of the component $P_1$, for example, these are $$P_1 = \frac{W_{11} - W_{21}}{2\alpha} \text{ or } \frac{W_{12} - W_{22}}{2\alpha} \text{ or} \quad (1)$$

$$\frac{W_{41} - W_{31}}{2\alpha} \text{ or } \frac{W_{42} - W_{32}}{2\alpha}$$

and $$P_1 = \frac{W_{11} - W_{22}}{2\alpha} \text{ or } \frac{W_{12} - W_{21}}{2\alpha} \quad (2)$$

$$\frac{W_{41} - W_{32}}{2\alpha} \text{ or } \frac{W_{42} - W_{31}}{2\alpha}$$

In each of the sets the four expressions are independent, by which is meant that none of the readings W appears in more than one expression, so that if one sensor fails only one of the four expressions is affected. The expressions in an arbitrarily chosen one of the sets can then be thought of as readings from four imaginary pseudo-sensors in a quadruplex arrangement, and any method of failure location in a quadruplex arrangement can be used to locate failed pseudo-sensors in the present arrangement. The important differences as far as failure transients are concerned are firstly that the margins of error of the pseudo-sensors are greater than those for the sensors, by a factor of $1/\alpha$ in the case of the component $P_1$, so that the failure transients are greater by the same factor, and secondly that the failure of one sensor in general gives rise to the failure of one pseudo-sensor for each of the three axes so that failure transients generally occur in all three components P simultaneously.

In the case of an assembly with three sensors in each group six pseudo-sensor readings for each of the three orthogonal axes can be derived and so any four failures can be located.

There are other methods of failure location than those which suggest themselves as a result of the pseudo-sensor concept and one of these, for an arrangement with two sensors per group which, will be described in more detail later is a two-stage detection process in which each failure is located to a particular group by monitoring the intra-group differences $W_{11}-W_{12}$, $W_{21}-W_{22}$, $W_{31}-W_{32}$ and $W_{41}-W_{42}$ (all of which should ideally be zero), and then to a particular sensor by monitoring the derived differences, which are derived from the grand difference $$E = W_{11} + W_{12} - W_{21} - W_{22} + W_{31} + W_{32} - W_{41} - W_{42}$$

(which should ideally be zero) by substituting for the readings of individual sensors the readings of the other sensors in their respective groups (which should ideally make no difference), so that, for example, $$E(11) = 2W_{12} - W_{21} - W_{22} + W_{31} + W_{32} - W_{41} - W_{42}$$

$$E(21) = W_{11} + W_{12} -$$

$$E(11,21) = 2W_{12} - 2W_{22} + W_{31} + W_{32} - W_{41} - W_{42}$$

It is also possible under certain circumstances to locate two simultaneous failures where by "simultaneous" is meant that the second occurs before the first has been located. This is possible if it is known in advance which pairs of sensors are liable to fail simultaneously, if no sensor appears in more than one pair, and if no pair contains two sensors in the same group. Such a situation may, for example, arise when, in a military aircraft, the sensors, instead of all being mounted in one location, are arranged in several locations in pairs so as to make the assembly less vulnerable to battle damage. If a shell hits one of the pairs it will probably cause both sensors in the pair to fail simultaneously. The computing apparatus may also be arranged so that certain failures cause the simultaneous loss of readings from predetermined pairs of sensors. If the pairs are carefully chosen the failure of a pair can be located correctly.

Since there are eight sensors there must be four pairs and there are only two essentially different ways of partitioning the sensors into pairs such that the criteria set out above are satisfied. Firstly two of the groups may be distributed between two of the pairs and the other two groups between the other two pairs so, for example, the pairs may be (11,21), (12,22), (31,41) and (32,42). Secondly the groups may be cyclically distributed among the pairs as, for example (11,22), (21,32), (31,42) and (41,12).

In the first case, if the intra-group differences indicate that there are simultaneous failures in two groups, for example groups 1 and 2, there are two possibilities. In the example the failure may be in the pair (11,21) or in the pair (12,22). The two possibilities can be resolved by monitoring the appropriate two derived differences, in the example E(11,21) and E(12,22). If E(11,21) exceeds its threshold of 8S first the failure is in the pair (12,22) but if E(12,22) exceeds its threshold first the failure is in the pair (11,21).

In the second case, when simultaneous failures are indicated in two groups, the failure can immediately be located. In the example if there are failures in groups 1 and 2 they must be in the pair (11,22); if there are failures in groups 2 and 3 they must be in the pair (21,32) and so on.

Pair-failure detection in the second case is therefore simpler but in the first case there is a higher probability of being able to survive a second pair failure. In the first case, in the examples given, a failure of (31,41) or (32,42) can be located whereas in the second case, when the first failure was in (11,22), only a failure of (31,42) can be located.

The failure transients depend on the method of calculation and failure location used, but for any method the failure transients in the components $P_1$, $P_2$ and $P_3$ contain factors of $1/\alpha$, $1/\beta$ and $1/\gamma$ respectively. If the troublesomeness of failure transients varies from one component to another $\alpha$, $\beta$ and $\gamma$ can therefore be chosen so that failure transients are smaller in the components in which they would be more troublesome.

Figure 2:
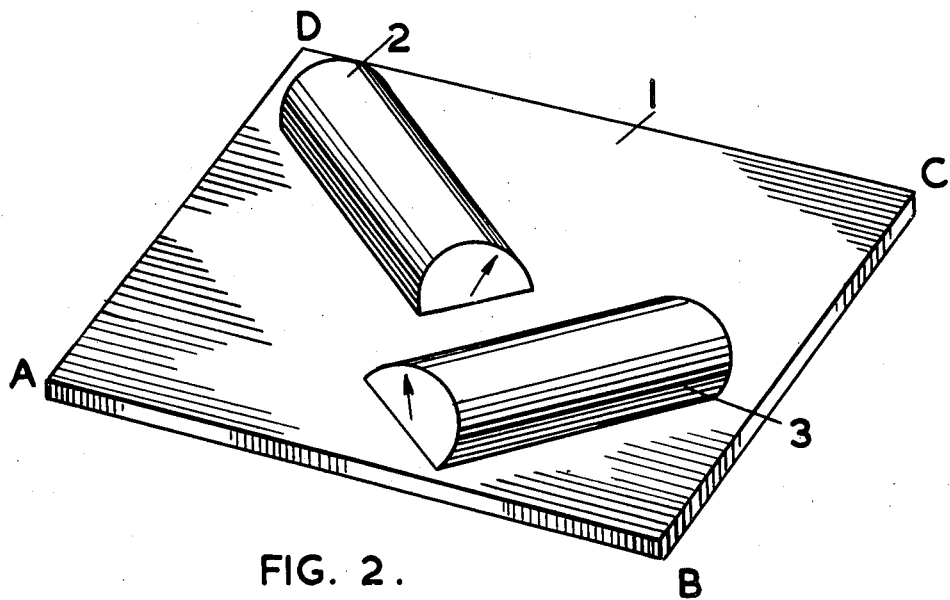
Figure 3:
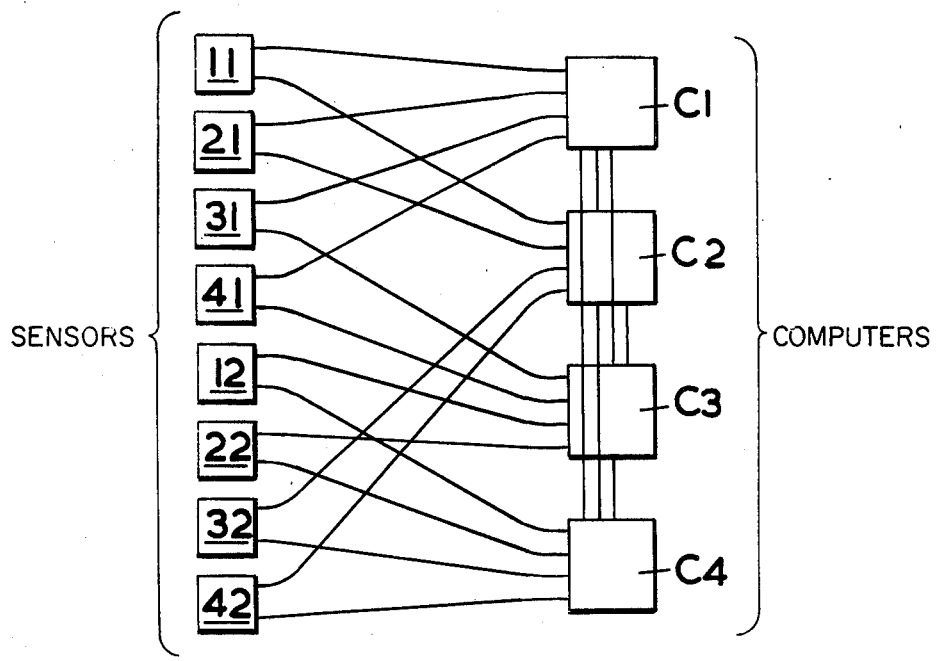
Figure 4:
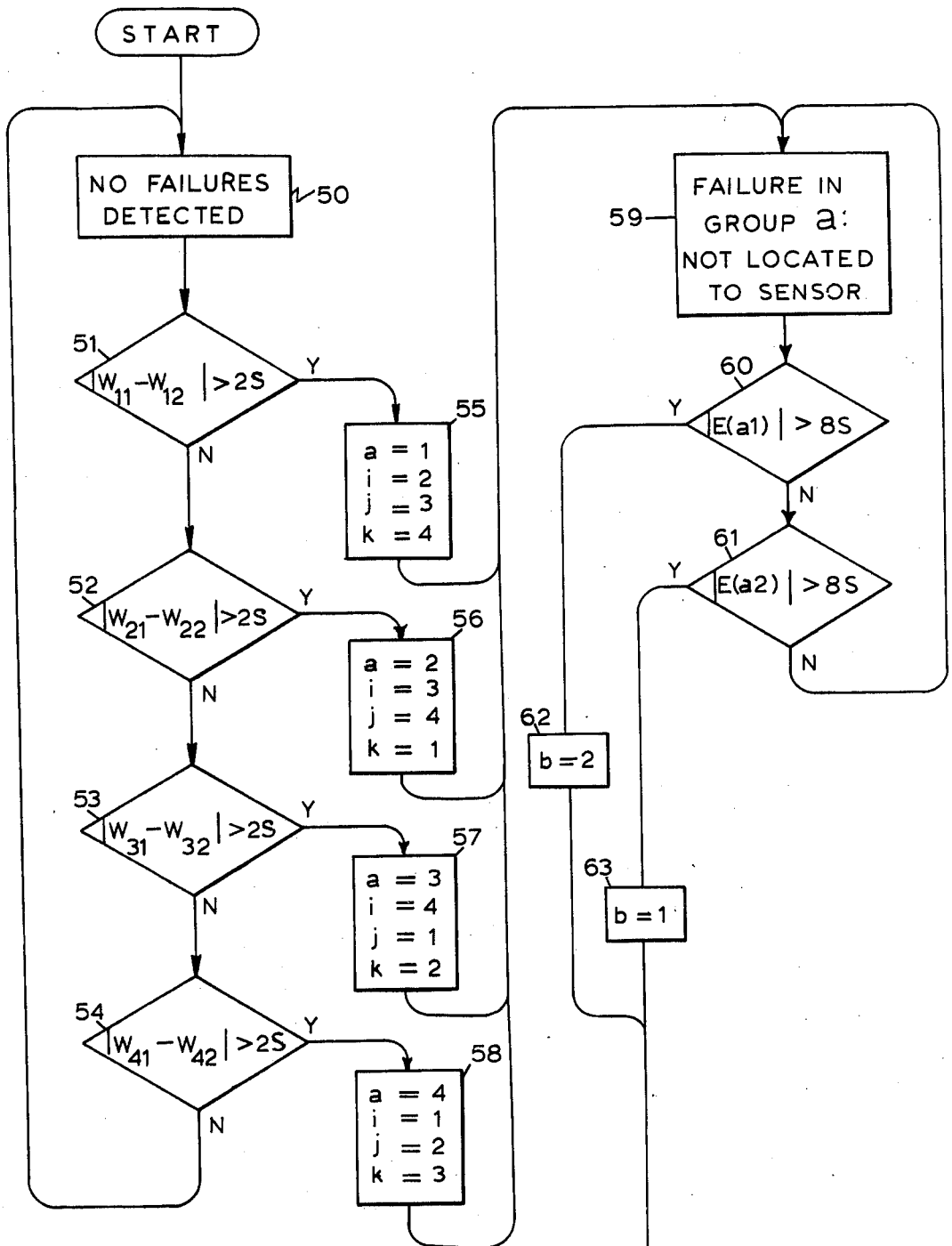
Figure 5:
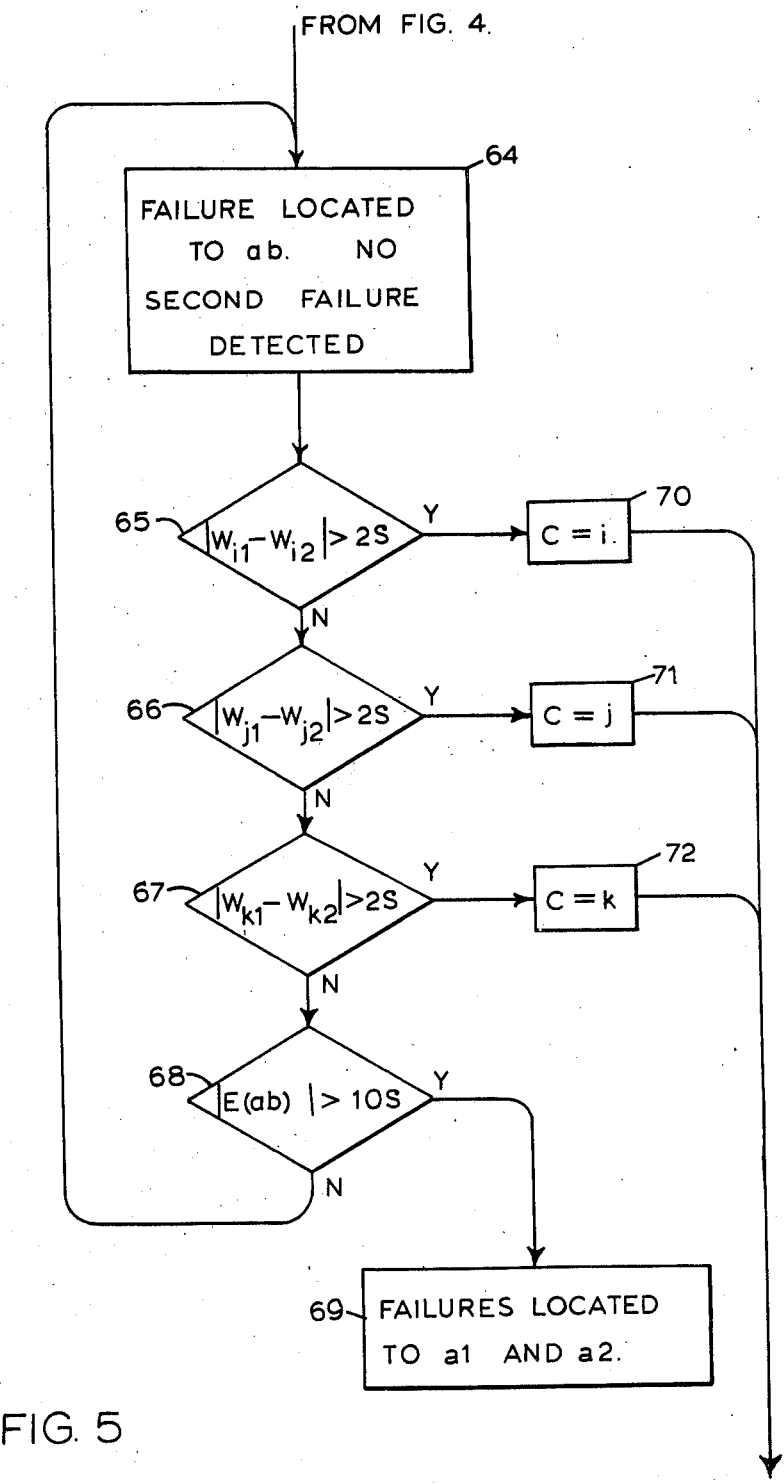
Figure 6:
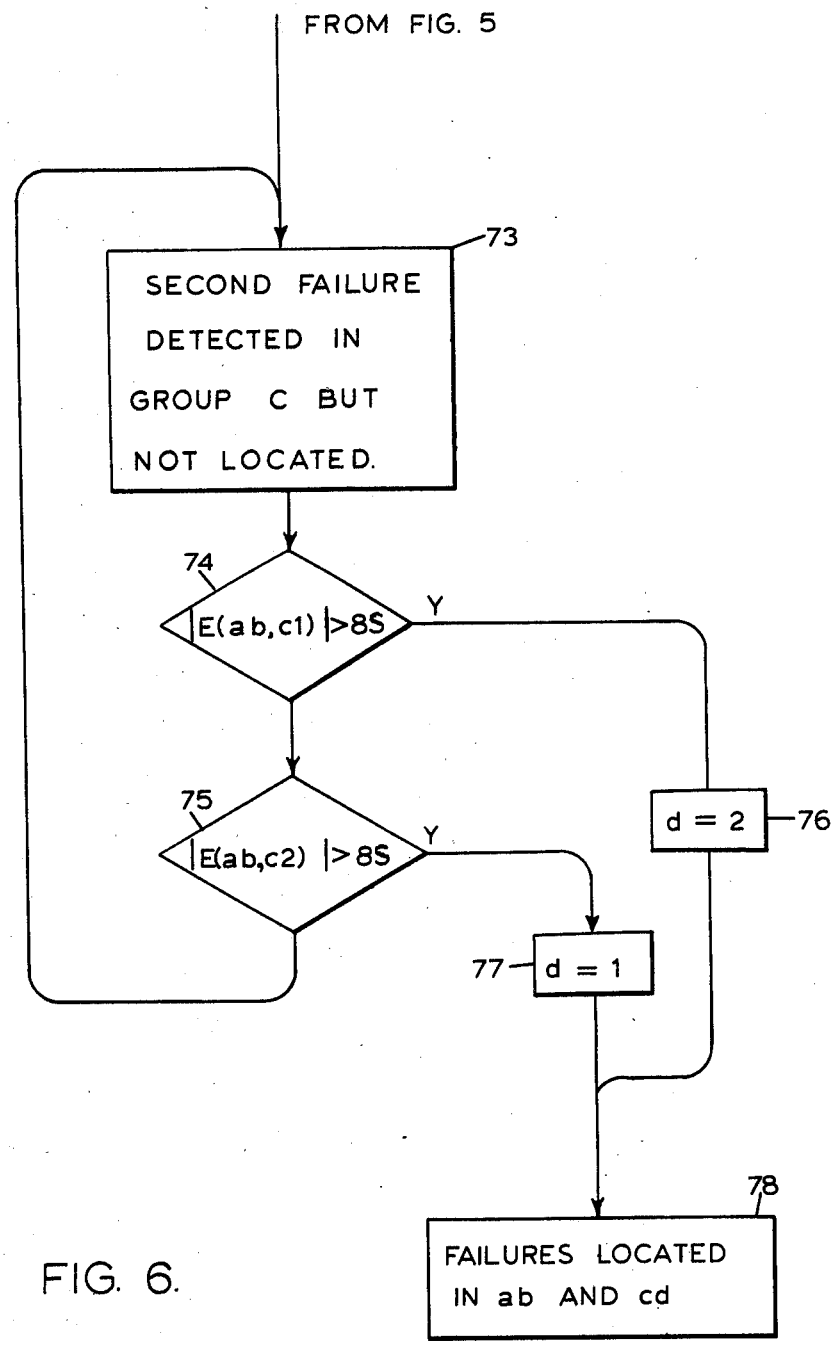

An embodiment of the invention will now be described by way of example with reference to the accompanying drawings of which:

FIG. 1 is a geometrical construction showing the directions of the measuring axes of the sensors in the invention relative to the coordinate axes of an aircraft, FIG. 2 is a schematic illustration showing how a pair of gyroscopic rate sensors may be arranged so as to have their measurement axes in two of the directions shown in FIG. 1, FIG. 3 shows schematically how the sensors in the invention may be interfaced to computers, and FIGS. 4 through 6 constitute a flow diagram of a method according to which the computers may be programmed to locate failures.

In FIG. 1 ABCDEFGH is a rectangular parallelepiped whose four diagonals are AG, BH, CE and DF. The edges of the parallelepiped ABCDEFGH are parallel to the three orthogonal axes in the directions in which it is required to measure the components of motion. The directions parallel to AB, AD and AE will be referred to as the $x$, $y$ and $z$ direction respectively. The sensors in the invention have their measurement axes aligned parallel to the diagonals: the sensors in the first group have their axes parallel to AG, those in the second group to BH, those in the third group to CE and those in the fourth group to DF. In the case where all three orthogonal axes are treated equally, so that the direction cosines $\alpha$, $\beta$ and $\gamma$ are equal, ABCDEFGH is a cube.

FIG. 2 illustrates how a pair of gyroscopic rate sensors may be arranged to have their measurement axes in two of the required directions. The arrangement is particularly convenient when ABCDEFGH is a cube, and it will be described assuming that that is to be the case, but it can easily be adapted to other cases. Gyroscopic rate sensors have an axis of rotation which is at right angles to the measurement axis. The physical shape of a gyroscopic sensor is approximately symmetrical about its axis of rotation, not its measurement axis. In FIG. 2 is shown a square plate 1 with two gyroscopic sensors 2 and 3 mounted in grooves in the plate 1. The sensors 2 and 3 are mounted with their axes of rotation at right angles to each other and parallel to the diagonals of the plate 1. When installed for use the plate 1 is mounted with its edges parallel to two of the orthogonal axes, say the $x$ and $y$ axes. The axes of rotation of the sensors 2 and 3 are then parallel to the directions BD and AC in FIG. 1 so the measurement axes must lie in the planes AEGC and BFHD respectively. The sensors 2 and 3 are fixed to the plate 1 so that their measurement axes make angles of about thirty-five degrees and sixteen minutes with the plate 1, as shown by arrows on FIG. 2, so that they lie parallel to the diagonals AG and BH respectively, so that the sensors 2 and 3 are in the first and second group respectively. If the plate 1 is turned through two right angles about the $z$ axis the measurement axes will lie parallel to the diagonals CE and DF so that the sensors will be in the third and fourth group respectively. An assembly of sensors according to the invention can thus be built from a plurality of identical plates each carrying two sensors as shown in FIG. 2. In the case where there are to be two sensors in each group four such plates will be needed. With such an arrangement the sensors are arranged in pairs according to the scheme (11,21), (12,22), (31,41), (32,42) to that pair-failure detection is possible.

In FIG. 3 the eight sensors 11, 21, 31, 41, 12, 22, 32 and 42 are connected so as to convey signals corresponding to their respective readings to four programmed digital computers C1, C2, C3 and C4. Sensor 11 conveys signals to computers C1 and C2 and sensor 21 also conveys signals to computers C1 and C2. Similarly sensors 31 and 41 each convey signals to computers C1 and C3, sensors 12 and 22 to computers C3 and C4 and sensors 32 and 42 to computers C2 and C4. Each of the computers C1, C2, C3 and C4 is also connected to each of the others so that signals received by any one computer are conveyed to all of the others. Each computer thus receives signals from each of the sensors via two routes; for example computer C1 receives signals from sensor 11 directly and via computer C2, and from sensor 12 via computer C3 and via computer C4.

Since there are four computers, each computing the same thing, for example pitch, roll and yaw rates, the loss of output from any two of them can be survived simply by using a majority vote system connected to receive the computed results from the computers. Also the loss of any two of the signal links, either between sensors and the computers or between computers, can be survived since at worst it will have the same effect as a detectable pair failure. For example if computer C1 fails, so that not only is the output from it lost but also the signals from it to the other computers, the other computers will continue to work since they are all still receiving signals from all the sensors by alternative routes. If computer C2 then similarly fails the signals from sensors 11 and 21 will be lost, but this is a detectable pair failure so the second failure can be survived.

Modifications of the embodiment described will be apparent to a person skilled in the relevant art; for example angular rotation rate sensors other than gyroscopic sensors in the accepted sense are now well known and any suitable sensors may be used in place of gyroscopic sensors. Also the invention may be used with other single-component sensors such as linear accelerometers.

A method according to which the computers may be programmed to detect and locate failed sensors will now be described with reference to FIGS. 4 through 6. Before any failures have been detected, (block 50), the value of $P_1$ is taken as the average value of the eight expressions (1) and (2). The intra-group differences are monitored (blocks 51–54) and when the magnitude of one of them becomes greater than 2S a failure is detected and located to a particular group, though not to a particular sensor (blocks 55–59). In blocks 55–58, $a$ is the group in which the failure was detected and $i$, $j$, and $k$ are the groups in which it was not detected.

When a failure has been located to a particular group the two derived differences corresponding to that group are monitored (blocks 60, 61). For example, if the failure is in group 1, E(11) and E(12) are monitored. When the magnitude of one of them becomes greater than 8S the failure is located to the $b$th sensor in group $a$ (blocks 62–64). For example if the magnitude E(12)

becomes greater than 8S the failure is in the sensor giving the reading $W_{11}$ since it is known that the failure is either in $W_{11}$ or $W_{12}$, and since E(12) is independent of $W_{12}$, but is greater than it should be, the failure must be in $W_{11}$.

When a first failure has been detected, the components are calculated as the average of those six of the eight expressions which do not contain the reading from the failed sensor so that if the failure was in $W_{11}$, $P_1$ is calculated as $$P_1 = 1/12\alpha$$
$$(2W_{12} - W_{21} - W_{22} - 2W_{31} - 2W_{32} + 2W_{41} + 2W_{42})$$

Those of the intra-group differences which do not involve the reading from the failed sensor are then monitored (blocks 65–67), and at the same time the derived difference derived by substituting for the reading of the first failed sensor (i.e. E(11) if the first failure was in $W_{11}$) is monitored (block 68). A second failure is detected and at least partially located when the magnitude of one of the intra-group differences exceeds 2S or when the magnitude of the derived differences exceeds 10S. If the magnitude of the derived difference exceeds 10S before any of the intra-group differences has exceeded 2S the failure is in the sensor which is in the same group as the first failed sensor (i.e., in $W_{12}$ if the first failure was in $W_{11}$) (block 69). The reason that the threshold for the derived difference is 10S and not 8S is that the failure has not been partially located. The fact that none of the intra-group differences has exceeded its threshold does not necessarily imply that none of the corresponding sensors have failed. One of the sensors may be reading as much as 3S high before the corresponding intra-group difference exceeds its threshold. If the first difference to exceed its threshold is one of the intra-group differences then the failure is located to the corresponding group, group c (blocks 70–73). To determine which of the two sensors in the group has failed, the two derived differences derived by substituting for the readings of both the first failed sensor and each one of the sensors in the group are monitored (blocks 74, 75) (i.e., if the first failure was in $W_{11}$ and the second failure is in group 2, E(11,21) and E(11,22) are monitored). When one of the derived differences exceeds 8S the failure is located to the d th sensor in group c (blocks 76–78). In the example given, for instance, if E(11,22) first exceeds 8S the failure is in $W_{21}$ since the failure is in group 2 and E(11,22) is independent of $W_{22}$ and yet has exceeded its threshold.

After a second failure has been detected, the components are calculated as the average of those four or five of the original eight expressions which do not involve readings from the failed sensors. If the first two failures are in different groups it is possible to locate correctly a third failure of a sensor in one of the other groups. In other words it is possible to survive three failures provided that they all occur in different groups. The third failure can be located by a continuation of the method used to locate the first two, namely monitoring the remaining two intra-group differences to determine in which group the failure occurs and then monitoring two appropriate derived differences to locate the failed sensor.

I claim:

1. An assembly of single-component motion sensors installed in an aircraft and comprising four groups of two sensors, said four groups consisting of a first group of two sensors having their measuring axes parallel and in the direction $(\alpha,\beta,\gamma)$, a second group of two sensors having their measuring axes parallel and in the direction $(-\alpha,\beta,\gamma)$, a third group of two sensors having their measuring axes parallel and in the direction $(-\alpha,-\beta,\gamma)$, and a fourth group of two sensors having their measurement axes parallel and in the direction $(\alpha,-\beta,\gamma)$, said directions being expressed relative to three orthogonal axes parallel to the pitch, roll and yaw axes respectively of the aircraft, and $\alpha,\beta$, and $\gamma$ being three nonzero numbers the sum of whose squares is equal to unity, the sensors being arranged 40 pairs, different pairs being installed in different locations in the aircraft, no pair having two sensors in the same group, and resolving means connected to receive outputs from the sensors for deriving therefrom components of motion relative to said three orthogonal axes, said resolving means being operative to detect, locate and allow for sensor failures up to two in number.

2. An assembly of single-component motion sensors comprising four groups of two sensors, said four groups consisting of a first group of two sensors having their measuring axes parallel and in the direction $(\alpha,\beta,\gamma)$, a second group of two sensors having their measuring axes parallel and in the direction $(-\alpha,\beta,\gamma)$, a third group of two sensors having their measuring axes parallel and in the direction $(-\alpha,-\beta,\gamma)$, and a fourth group of two sensors having their measurement axes parallel and in the direction $(\alpha,-\beta,\gamma)$, said directions being expressed relative to three orthogonal axes and $\alpha,\beta$, and $\gamma$ being three nonzero numbers the sum of whose squares is equal to unity, and resolving means connected to receive outputs from the sensors for deriving therefrom components of motion relative to said three orthogonal axes, said resolving means being operative to detect, locate and allow for sensor failures up to two in number, said resolving means comprising a computer programmed to locate sensor failures by monitoring intra-group differences between outputs from sensors in the same group and derived differences, derived from the grand difference, which is defined as the sum of the outputs of the sensors in the first group minus the sum of the outputs of the sensors in the second group plus the sum of the outputs of the sensors in the third group minus the sum of the outputs of the sensors in the fourth group, by substituting for outputs of individual sensors the outputs of the other sensors in their respective groups.

3. An assembly of single-component motion sensors consisting of four groups of two sensors, said four groups being a first group of only two sensors which have their measuring axes parallel and in the direction $(\alpha, \beta, \gamma)$, a second group of only two sensors which have their measuring axes parallel and in the direction $(-\alpha,\beta,\gamma)$, a third group of only two sensors which have their measuring axes parallel and in the direction $(-\alpha, -\beta, \gamma)$, and a fourth group of only two sensors which have their measurement axes parallel and in the direction $(\alpha, -\beta, \gamma)$, said directions being expressed relative to three orthogonal axes and $\alpha, \beta$, and $\gamma$ being three nonzero numbers the sum of whose squares is equal to unity, and means for combining together outputs from pairs of sensors in different groups to derive therefrom estimates of components of motion in the direction of each of the said three orthogonal axes, said combining means being arranged to derive for each of said components four estimates no two of which include contributions from the same sensor.

4. An assembly of single-component motion sensors consisting of four groups of two sensors, said four groups being a first group of only two sensors which have their measuring axes parallel and in the direction $(\alpha, \beta, \gamma)$, a second group of only two sensors which have their measuring axes parallel and in the direction $(-\alpha, \beta, \gamma\gamma)$, a third group of only two sensors which have their measuring axes parallel and in the direction $(-\alpha, -\beta, \gamma)$, and a fourth group of only two sensors which have their measurement axes parallel and in the direction $(\alpha, -\beta, \gamma)$, said directions being expressed relative to three orthogonal axes and $\alpha$, $\beta$, and $\gamma$ being three nonzero numbers the sum of whose squares is equal to unity, resolving means connected to receive outputs from the sensors for deriving therefrom components of motion relative to said three orthogonal axes, said resolving means being operative to detect, locate and allow for sensor failures up to two in number, said resolving means comprising means for combining together outputs from pairs of sensors in different groups to derive therefrom estimates of components of motion in the direction of each of said three orthogonal axes, said estimates consisting of, for each of said components, four estimates no two of which include contributions from the same sensor, and majority voting means for deriving a single estimate of each of said components from said four estimates.

* * * * *